(12) United States Patent
Bell et al.

(10) Patent No.: US 9,274,676 B2
(45) Date of Patent: *Mar. 1, 2016

(54) CONTROLLING THREE-DIMENSIONAL VIEWS OF SELECTED PORTIONS OF CONTENT

(71) Applicant: International Business Machines Corporation, Armonk, NY (US)

(72) Inventors: Denise A. Bell, Austin, TX (US); Travis M. Grigsby, Austin, TX (US); Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 203 days.

This patent is subject to a terminal disclaimer.

(21) Appl. No.: 14/024,180

(22) Filed: Sep. 11, 2013

(65) Prior Publication Data

US 2014/0013281 A1    Jan. 9, 2014

Related U.S. Application Data

(63) Continuation of application No. 12/965,375, filed on Dec. 10, 2010, now Pat. No. 8,589,822.

(51) Int. Cl.
*G06F 3/048*  (2013.01)
*G06F 3/0481* (2013.01)
(Continued)

(52) U.S. Cl.
CPC ........ *G06F 3/04815* (2013.01); *G02B 27/2228* (2013.01); *G06F 3/0482* (2013.01); *G06F 3/0488* (2013.01)

(58) Field of Classification Search
CPC ... G06F 3/04815; G06F 3/0346; G06F 17/50; G06T 15/00; G06T 15/005; G06T 15/08; G06T 15/10; G06T 15/20; G06T 15/40; G06T 17/00; G06T 19/00; G06T 19/20; G06T 2207/10012; H04N 13/0239; H04N 13/0018; H04N 13/0242; H04N 13/0275; H04N 13/0207; H04N 2213/003; H04N 2213/005; G09G 3/003
See application file for complete search history.

(56) References Cited

U.S. PATENT DOCUMENTS 5,825,998 A    10/1998    Brechner
5,880,733 A    3/1999    Horvitz et al.
(Continued)

OTHER PUBLICATIONS

"Apple exploring interactive, glasses-free 3D holographic displays", AppleInsider http://www.appleinsider.com/print/10/05/13/apple_exploring_interactive_glasses_free_3d_holographic_displays.html (Date Obtained from the Internet: Aug. 25, 2010) May 13, 2010, 4 pages.

(Continued)

*Primary Examiner* — Claudia Dragoescu
(74) *Attorney, Agent, or Firm* — DeLizio Law, PLLC

(57) ABSTRACT

Some embodiments of the inventive subject matter are directed to determining that at least a portion of content would be obscured by a border of a graphical user interface if the content were to be presented in a two-dimensional state via the graphical user interface, and presenting the at least the portion of the content in a stereoscopic three-dimensional state in response to the determining that the at least the portion of the content would be obscured by the border of the graphical user interface, wherein a stereoscopic depth effect of the stereoscopic three-dimensional state makes the at least the portion of the content appear to extend beyond the border of the graphical user interface.

19 Claims, 10 Drawing Sheets

(51) Int. Cl.
*G02B 27/22* (2006.01)
*G06F 3/0482* (2013.01)
*G06F 3/0488* (2013.01)

(56) References Cited

U.S. PATENT DOCUMENTS

| | | |
|---|---|---|
| 6,243,054 B1 | 6/2001 | DeLuca |
| 6,559,813 B1 | 5/2003 | DeLuca et al. |
| 6,621,509 B1 | 9/2003 | Eiref et al. |
| 2002/0105537 A1 | 8/2002 | Orbanes et al. |
| 2004/0196259 A1 | 10/2004 | Bradski |
| 2006/0123361 A1 | 6/2006 | Sorin et al. |
| 2006/0253802 A1 | 11/2006 | Kim |
| 2009/0089689 A1* | 4/2009 | Clark et al. .......... 715/762 |
| 2011/0050687 A1* | 3/2011 | Alyshev et al. ....... 345/419 |
| 2011/0296327 A1 | 12/2011 | Kang et al. |
| 2012/0151416 A1 | 6/2012 | Bell et al. |

OTHER PUBLICATIONS

Singh, Vikas et al., "Interactive Volume Manipulation with Selective Rendering for Improved Visualization", Proceedings of the 2004 IEEE Symposium on Volume Visualization and Graphics http://citeseerx.ist.psu.edu/viewdoc/download?doi=10.1.1.108.3120&rep=rep1Mype=pdf 2004, pp. 95-102.
"U.S. Appl. No. 12/965,375 Office Action", Dec. 3, 2012, 35 pages.

* cited by examiner

CONTROLLING THREE-DIMENSIONAL VIEWS OF SELECTED PORTIONS OF CONTENT

RELATED APPLICATIONS

This application is a continuation of, and claims priority benefit to, U.S. patent application Ser. No. 12/965,375, filed Dec. 10, 2010. The Ser. No. 12/965,375 Application is incorporated herein by reference.

BACKGROUND

Embodiments of the inventive subject matter generally relate to the field of presenting and controlling data, and, more particularly, to multi-dimensional presentations of content.

Space limitation on a user interface (UI) is a prevalent problem for applications rendered on all types of displays such as monitors, workstations, and mobile devices. The displays have specific dimensions within which the user interface is presented. The dimensions are limited by the physical size of the display hardware. An application developer must, therefore, make design choices regarding how content is displayed given the space limitations of the hardware. Presentation of user interfaces for the applications is, therefore, limited to the design specifications dictated by the application developer.

SUMMARY

Some embodiments of the inventive subject matter are directed to determining that at least a portion of content would be obscured by a border of a graphical user interface if the content were to be presented in a two-dimensional state via the graphical user interface presenting the at least the portion of the content in a stereoscopic three-dimensional state in response to the determining that the at least the portion of the content would be obscured by the border of the graphical user interface, wherein a stereoscopic depth effect of the stereoscopic three-dimensional state makes the at least the portion of the content appear to extend beyond the border of the graphical user interface.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to some types of three-dimensional viewing technologies, other instances may include other three-dimensional techniques and/or technologies such as, but not limited to, anaglyph images, polarized projections, autostereoscopic displays, computer-generated holography, volumetric displays, infrared laser projections, side-by-side viewing, autostereograms, pulfrich effects, prismatic & self-masking crossview glasses, lenticular prints, displays with filter arrays, wiggle stereoscopy, active 3D viewers (e.g., liquid crystal shutter glasses, red eye shutterglasses, virtual reality headsets, personal media viewers, etc.), passive 3D viewers (e.g., linearly polarized glasses, circularly polarized glasses, interference filter technology glasses, complementary color anaglyphs, compensating diopter glasses for red-cyan method, Color-Code 3D, aromaDepth method and glasses, Anachrome compatible color anaglyph method, etc.), 3D televisions, some combinations therefore, etc. In other instances, well-known instruction instances, protocols, structures, and techniques have not been shown in detail in order not to obfuscate the description.

As mentioned previously, user interfaces (e.g., graphical user interfaces or GUIs) are limited. For example, user interfaces have typically rendered depictions of content using two-dimensional (2D) views. Embodiments of the inventive subject matter, however, present selected portions of content using three-dimensional (3D) views. Some embodiments can present the selected portions of the content in 3D while simultaneously presenting other portions of the content in 2D. Some embodiments further can present the 3D portions in context with the 2D portions of the content.

Figure 1:
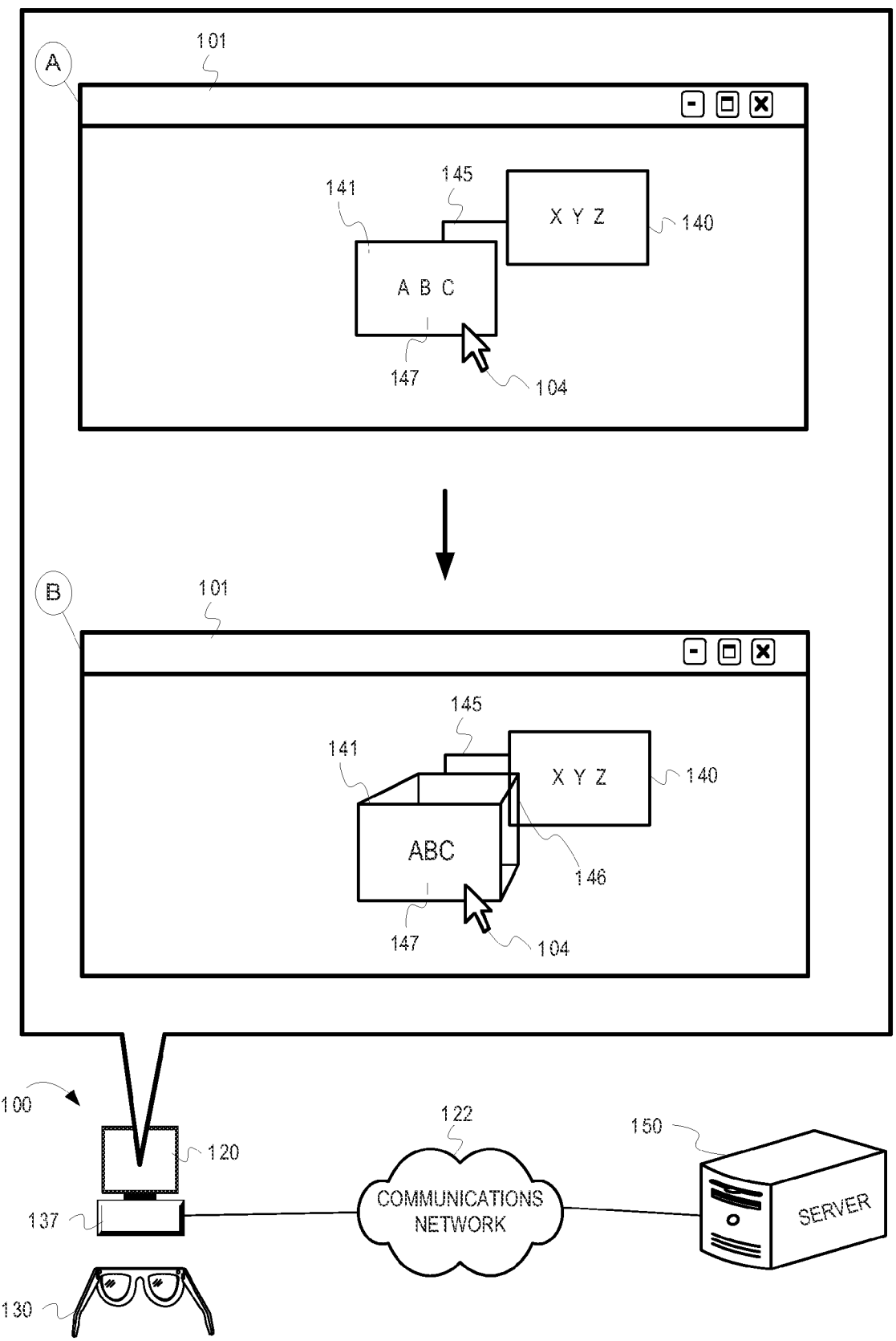
FIG. 1 is an example conceptual diagram of presenting a portion of content in a three-dimensional view in context of other portions of the content in a two-dimensional view.

FIG. 1 is an example conceptual diagram of presenting a portion of content in a three-dimensional view in context of other portions of the content in a two-dimensional view. In FIG. 1, a system 100 includes a computer 137 configured to receive user input (e.g., via a keyboard, a mouse, etc.). The computer 137 presents content, such as a window 101 that presents objects 140 and 141, on a display 120 (e.g., via a computer desktop, a GUI workspace or dashboard, etc.). The computer 137 can also be connected to a server 150 via a communications network 122. One or more components of the system 100, such as the computer 137 or the server 150, detect a user interaction with a portion of content. For example, at stage "A," the system 100 detects a user input (e.g., a mouse touch-and-click event using the mouse pointer 104) that selects the object 141 within the window 101.

The system 100, at stage "B," changes a view, or rendering, of the object 141 from a two-dimensional view (e.g., where the object 141 appears to have only a length and width) to a three-dimensional view (e.g., where the object 141 appears to have a length, width and depth). The changing from 2D to 3D includes, in some embodiments, modifying the rendering of the structure of the object 141 so that the structure of the object 141 appears to have the perception of binocular stereoscopic depth. To do so, the display 120 may be configured as a 3D display and/or a user interface controller (e.g., an operating system of the computer 137) can be configured to generate 3D effects for portions of content. The system 100 can, therefore, turn on the 3D rendering capabilities of the display 120 only for the object 141 and not, for example, for the window 101, the object 140, or any other non-selected portion of the content. In other embodiments, the system 100 may utilize a 3D display technology that does not require the display 120 to be 3D enabled, but that may instead utilize a 3D viewer, such as 3D glasses 130, a 3D screen over the display 120, or any other 3D viewing mechanism between the display 120 and a user's eyes. For instance, the system 100 may modify the structure of the object 141 to be an anaglyph image. Anaglyph images are used to provide a stereoscopic 3D effect when viewed with glasses where the two lenses of the glasses are different (usually chromatically opposite) colors, such as red and cyan. The anaglyph images are made up of two color layers (one for each eye), superimposed, but offset with respect to each other to produce a depth effect to a specific object when viewed through the glasses. Usually the specific object is in the center, while the foreground and background are shifted laterally in opposite directions. When the two color layers are viewed simultaneously through the anaglyph glasses, an integrated stereoscopic image appears. The visual cortex of the brain fuses the two images into the perception of a three-dimensional scene or composition. Thus, in one example, the system 100 presents structural elements of the object 141 in the two color layers in an offset position to each other that, with the assistance of the 3D glasses 130, appear to present binocular stereoscopic depth. The color layers of the object 141, without the 3D glasses 130, may appear overlapped, stacked, tightly grouped, etc. With the 3D glasses 130, however, the color layers of the object 141 come into 3D view.

In another example, the system 100 may instead render structural elements of the object 141 as a 3D image that can be viewed with polarized 3D glasses. Polarized 3D glasses create the illusion of three-dimensional images by restricting the light that reaches each eye, an example of stereoscopy which exploits the polarization of light. To present a stereoscopic video, for example, two images are projected superimposed onto the same screen through different polarizing filters. The viewer wears eyeglasses which also contain a pair of different polarizing filters. Each of the viewer's eyes sees a different image as each filter passes only that light which is similarly polarized and blocks the light polarized in the opposite direction. The use of the polarized 3D glasses thus produces a three-dimensional effect by projecting the same scene into both the viewer's eyes, but depicted from slightly different perspectives. Since no head tracking is involved, several people can view the stereoscopic images at the same time.

In another example, the system 100 may utilize an autostereoscopic display for the display 120. Autostereoscopic displays use optical trickery at the display hardware to ensure that each eye sees the appropriate image. A 3D viewer is not required to be worn by the user. Autostereoscopic displays generally allow the user to move their head a certain amount without destroying the illusion of depth.

Also, at stage "B," the system 100 can modify text 147 to appear in 3D. The system 100 imparts a stereoscopic 3D depth effect to the text 147 which causes the text to appear closer to the user. The system 100 also modifies the kerning of the text, causing the appearance of the characters to be closer to each other and, in some instances, allowing more text to appear in a bounded area related to the object 141. The stereoscopic 3D depth effect generated by the system 100, however, causes the text 147 to appear clear and readable even though the kerning causes the characters to be closer to each other.

Further, also at stage "B," the system 100 can render the object 141 in 3D while maintaining a context of the object 141 in relation to other portions of content. For example, at stage "A," the object 141 is positioned to the left and primarily below the object 140. The object 141 is connected to the second object 140 via a connector 145. At stage "B," the system 100 causes the object 141 to appear 3D, but still remains positioned to the left and primarily below the object 140. Further, the system 100 causes the object 141 to remained connected to the object 140 via the connector 145. In some embodiments, the system 100 can cause a portion 146 of the object 141 to appear to overlap a portion of the object 140.

Figure 2:
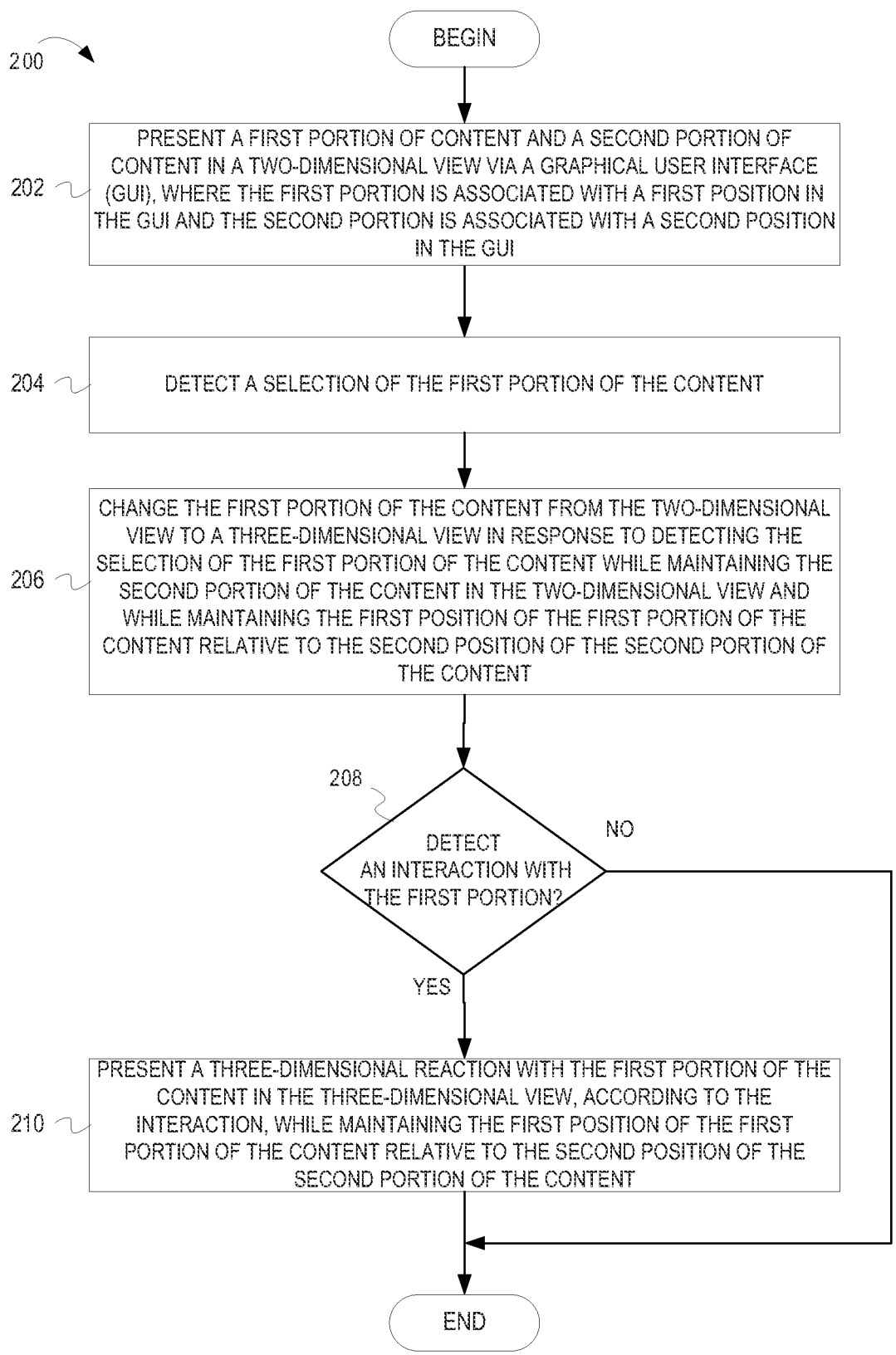
FIG. 2 is a flowchart depicting example operations for presenting a portion of content in a three-dimensional view in response to user input and modifying presentation of the three-dimensional view in response to additional user input.

FIG. 2 is a flowchart depicting example operations for presenting a portion of content in a three-dimensional view in response to user input and modifying presentation of the three-dimensional view in response to additional user input. For exemplary purposes, operations associated with the blocks in FIG. 2 will be described as being performed by a system, which may, for example, include any or all of the elements described in FIG. 1 and/or FIGS. 3-10. FIG. 2 illustrates a flow 200 that the system can perform.

Referring to FIG. 2, the system presents a first portion of content and a second portion of content in a two-dimensional view via a graphical user interface (GUI), where the first portion is associated with a first position in the GUI and the second portion is associated with a second position in the GUI (202). The first and second positions can be coordinates on a display. The system presents the first portion of the content simultaneously with the second portion of the content.

Further, the system detects a selection of the first portion of the content (204). In some embodiments, the selection may be via direct user input, such as via a mouse touch-and-click event. In other embodiments, the selection may be related to, though not directly indicated by a user input. For example, the first portion of content may be configured to react to a change of state of the second portion of the content, or express activity performed by user input to the second portion of the content. As a result, the system may select the first portion of the content in response to the change of state of the second portion of the content.

Further, the system changes the first portion of the content from the two-dimensional view to a three-dimensional view in response to detecting the selection of the first portion of the content while maintaining the second portion of the content in the two-dimensional view and while maintaining the first position of the first portion of the content relative to the second position of the second portion of the content (206). The system can change the first portion of the content from the two-dimensional view to the three-dimensional view by modifying visual elements of the first portion of the content to have a stereoscopic depth effect. The stereoscopic depth effect can be perceptible by a 3D viewing mechanism (e.g., a passive 3D viewer, an active 3D viewer, a 3D screen overlay, etc.), presentable by 3D-enabled display hardware, or presentable by one or more 3D presentation techniques that can present the stereoscopic depth effect using 2D-enabled display hardware. The system can maintain the first position of the first portion of the content relative to the second position of the second portion of the content by keeping the first portion of the content in a similar position to where it was when it was presented in the 2D view. In some embodiments, the system may anchor, or pin, the first portion of the content to a coordinate or to a range of coordinates. The system can further associate (e.g., tether, link, etc.) the first portion of the content with the second portion of the content so that if the second portion of the content moves, the first portion of the content will move as well and maintain a relative position to the second portion of the content. The system, thus, can cause that the first portion of the content to remain in context with the second portion of the content.

Further, the system detects whether an interaction occurs with the first portion of the content (208). For example, the system may detect a user input that attempts to move the first portion of the content. In other embodiments, the interaction may be a result of physics reactions by other objects, such as objects associated with the second portion of the content. In other embodiments, the interaction may be by automated functions associated with the content.

If the system detects a second user input, then the system presents a three-dimensional reaction with the first portion of the content in the three-dimensional view, according to the second user input, while maintaining the first position of the first portion of the content relative to the second position of the second portion of the content (210). For example, the system can rotate the portion of the content on one or more axis and present details associated with multiple angles, or views, of the first portion of the content.

Figure 3:
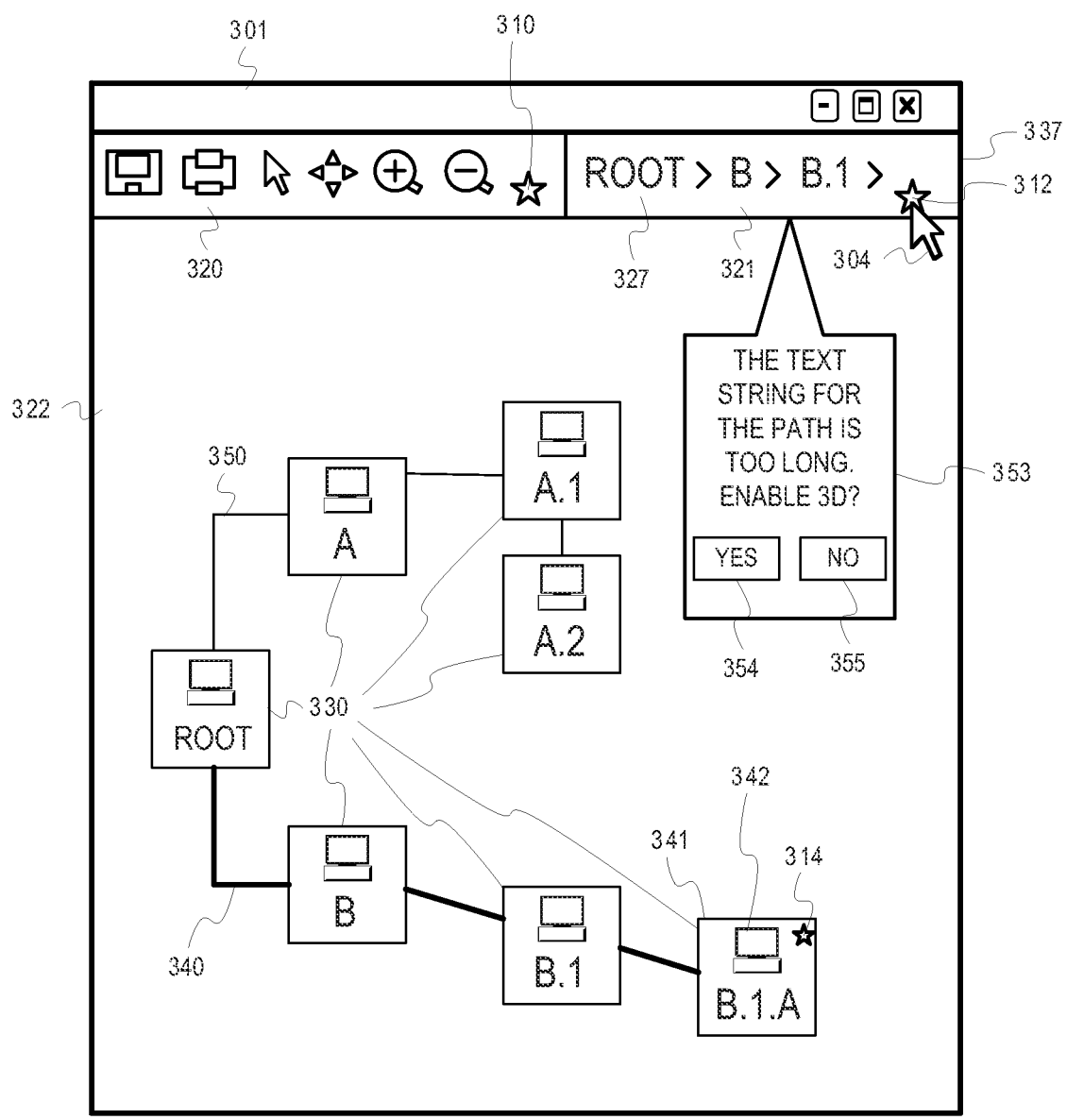
FIGS. 3-5 are example conceptual diagrams of presenting various portions of content on a graphical user interface in three-dimensional views.
Figure 4:
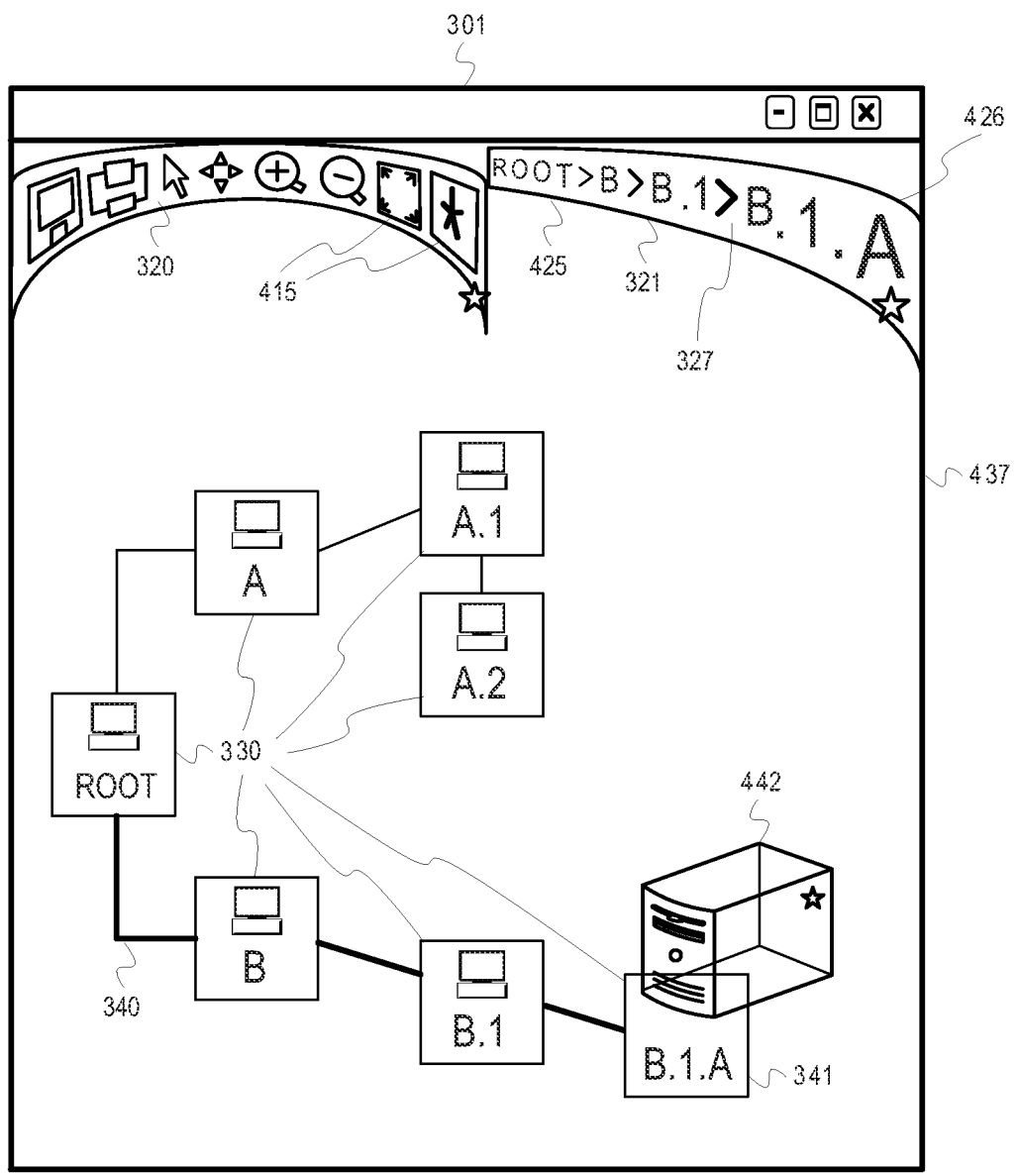
Figure 4:
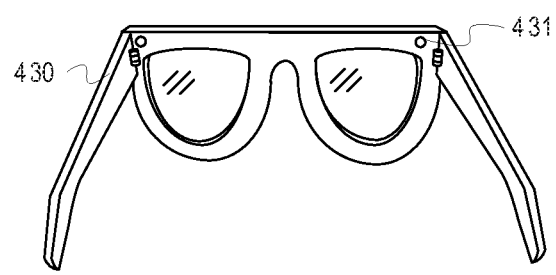
Figure 5:
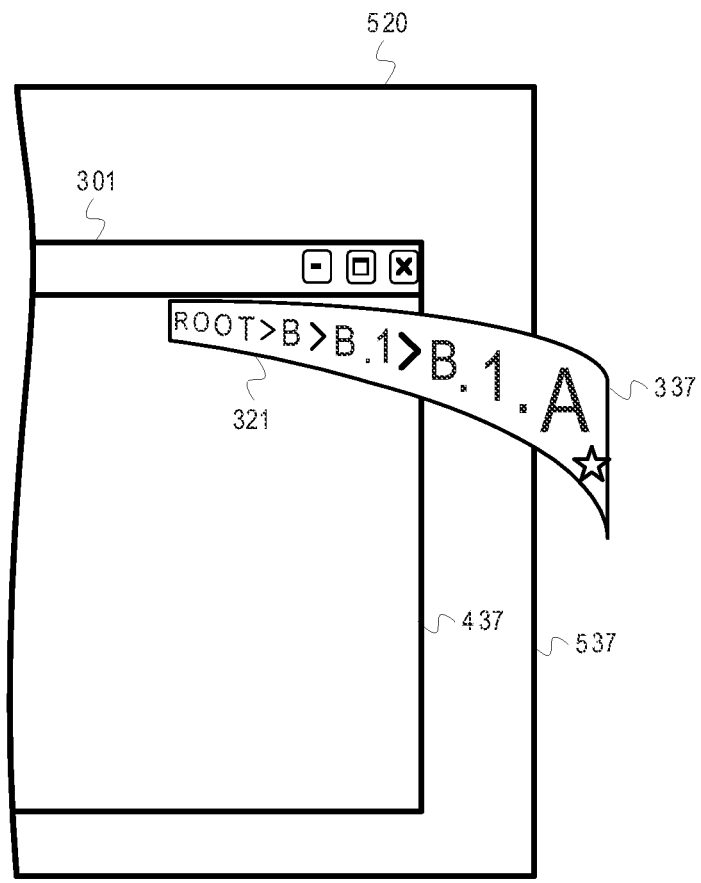
Figure 5:
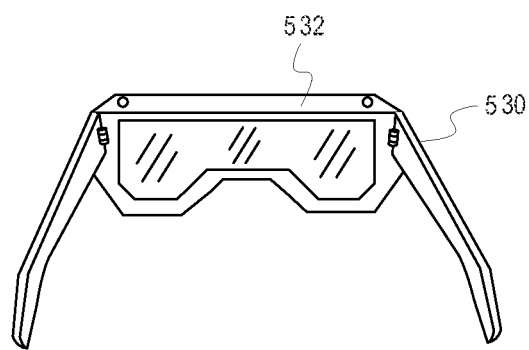
Figure 6:
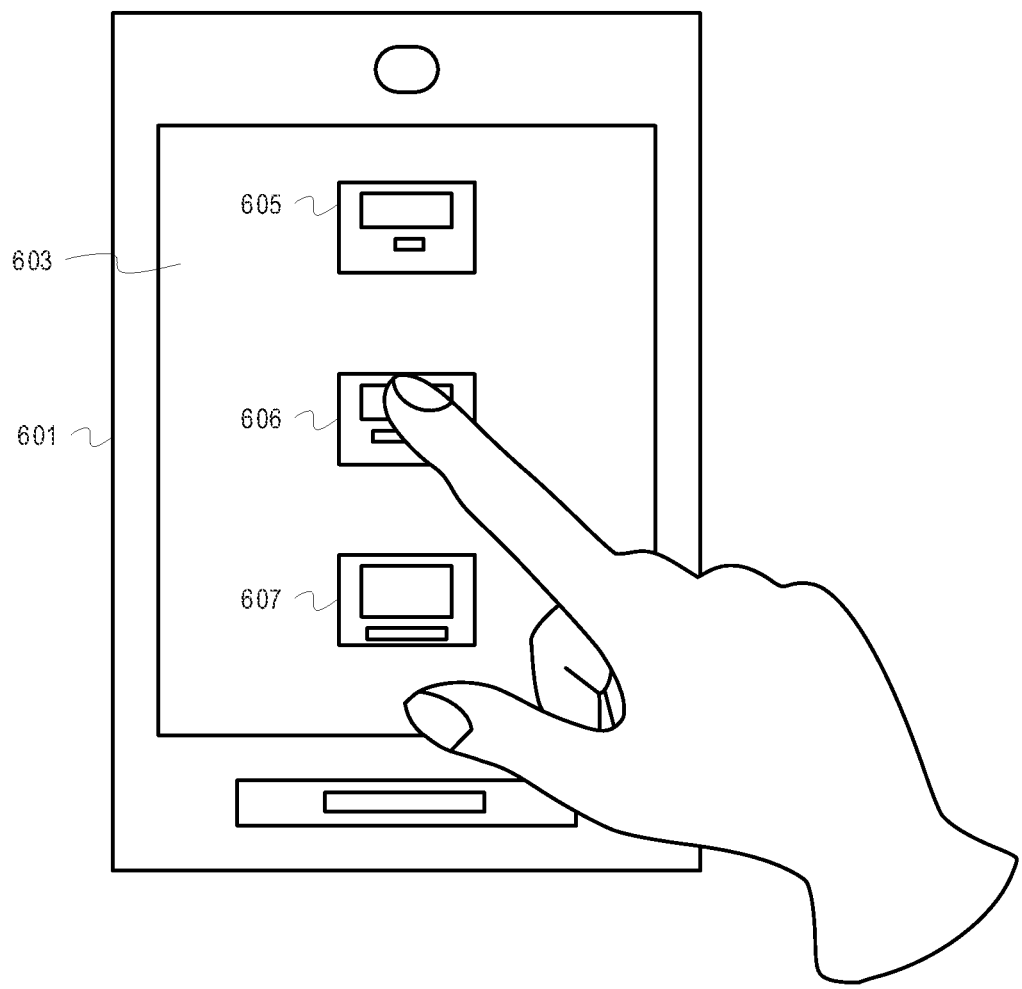
FIGS. 6-9 are example conceptual diagrams of presenting various portions of content on a graphical user interface of a mobile device in three-dimensional views.

FIGS. 3-5 are example conceptual diagrams of presenting various portions of content on a graphical user interface in three-dimensional views. FIGS. 3-5 illustrate one or more of the operations described in flow 200. For example, in FIG. 3, the system presents a window 301. The window 301 is a graphical user interface. The window 301 includes a toolbar 320, an area 321, and a body 322. The body 322 presents a grouping of objects 330. The objects 330 represent a map of clustered items, such as a network of computers or devices. Each of the objects 330 represents a separate item. The objects 330 are grouped in a hierarchical manner. For example, a root item ("Root") begins the hierarchy. The hierarchy has two separate branches of items, an "A" branch and a "B" branch. The "A" branch of items follow a first path 350 and the "B" branch of items follows a second path 340. The system detects a selection of the second path 340 (e.g., a user selects any one of the objects 330 in the second path 340). The area 321 specifies, via a text string 327 a representation of as many of the objects 330 in the branch for the second path 340 that fit within the area 321. The text string 327 may list the objects 330 of the second path 340 in descending order of the hierarchy. As some point, as more of the objects 330 are generated on the second path 340, the second path 340 increases in length, causing the text string 327 to increase in length. Consequently, the text string 327 no longer fits within the area 321.

In some embodiments, the system can present a prompt 353 that the text string 327 is approaching a boundary 337 of the area 321. The prompt 353 includes a message to the enable a 3D presentation of the text string 327 within the area 321. The prompt may include controls 354 and 355. For example, if the user selects the control 354, which accepts the prompt 353, then the system can select the text string 327 and cause the text string 327 to change from a 2D view to a 3D view. In other embodiments, the system presents a control 312 that a user can select via user input, for example, by positioning a mouse pointer 304 over the control 312 and clicking a mouse button or striking a keyboard key. The system can detect a user input via the control 312 and can cause the change from the 2D view to the 3D view.

Referring to FIG. 4, the system causes the area 321 to have the perception of binocular stereoscopic depth. In some embodiments, a user may be required to use a 3D viewer, such as 3D glasses 430. The 3D glasses 430 may include sensors 431 that can detect when a user puts on the glasses. The system can, by detecting when a user puts on the glasses, cause selected portions of content to appear 3D.

Still referring to FIG. 4, in a 3D view, the system causes a first portion, or back 425 of the area 321 to appear to be farther away from an observer and a second portion, or front 426 of the area 321 to appear to be closer to an observer. As a result of the binocular stereoscopic depth, the system causes the text string 327 associated with the area 321 to appear to be further from the user's view toward the back 425 and closer to the user's view toward the front 426 of the area 321. The system thus causes the appearance of text string 327 to become smaller in size toward the back 425 and larger in size toward the front 426 as the second path 340 grows in length. In other words, the system automatically changes the appearance of the text string 327 to fit into the area 321 according to the size of the second path 340. In some embodiments, the system automatically changes the kerning, the perspective, the shape, the size, or other characteristics of the font based on an amount of data that needs to be presented in the area 321, based on a resolution for a display on which the window 301 is presented, based on capabilities of the 3D technology associated with the display on which the window 301 is presented, based on capabilities of a 3D viewer that a user uses to view the window 301, etc. For instance, the system can change the kerning to cause text characters to be closer to each other. However, because the system also applies a 3D stereoscopic effect, portions of the text may stand out more than others. For instance, the system can cause the right side of a text string to appear closer to a user than a left side of a text string, and thus the perception of depth makes the text easy to read even though the characters are closer to each other.

Referring back to FIG. 3, the system modifies other selected portions the content of the window 301. For example, the system can detect an activation of a control 310. The activation of the control 310 causes the toolbar 320, in FIG. 4, to appear bent, with the outer portions appearing to stick out toward the Observer white an inner portion of the toolbar 320 appears to be further away from the observer. The bent effect of the toolbar 320 may also be a result of a 3D perception of binocular stereoscopic depth. The system can also modify a degree of parallax, or 3D depth, based on a number of icons to be displayed on the toolbar 320. For example, the system may require two additional icons 415 to be presented on the toolbar 320. As a result, the system may modify the parallax of the 3D effect on the toolbar 320 to cause the appearance of the toolbar 320 have a proper amount of bend and depth that allows all of the previously presented icons and the two additional icons 415.

Because the system causes the text string 327, the area 321, and the toolbar 320 to have a 3D appearance, the system extends a viewable area of the selected portions of the content. Further, the system causes the area 321 to change into 3D when selected, but also causes other portions of the window 301 to appear 2D, such as a frame for the window 310. Further, the system causes the area 321 and the toolbar 320 to maintain a relative position to the frame of the window 301, In other words, the system causes the area 321 and the toolbar 320 to remain at an upper portion of the window 301 where they would appear in 2D.

As mentioned previously, in some embodiments, the 3D view of the area 321 and the toolbar 320 may require the use of a passive 3D viewer, such as the 3D glasses 430, which cause the area 321, for example, to appear 3D but still remain within one or more dimensions (e.g., length or width), areas, boundaries, etc, of the window 301, such as a frame or border 437 of the window 301. In other embodiments, however, as in FIG. 5, the system can present the area 321, within an active 3D viewer 530. The active 3D viewers may be a virtual reality headset, a personal media viewer, etc., that includes 3D display capabilities within a display 532. The system can, via the active 3D viewer 530, cause the boundary 337 of the area 321 appear to extend beyond the border 437 of the window 301 and beyond a border 537 of a display 520 on which the window 301 is presented. The system can anchor the position of the area 321 relative to the upper portion of the window

301, track head movements of a user wearing the active 3D viewer 530, and cause the location of the area 321 appear to remain at the upper portion of the window 301.

Returning to FIG. 3, in some embodiments, the system can detect a selection of one of the objects 330 (e.g., the item 341). For instance, the system can detect when a user selects, a control 314 associated with the item 341. The system can present a 3D view of the object 342 associated with the item 341. In FIG. 4, the system presents the 3D view of the object 342 as a 3D frame 442 that represents the object 342 associated with the item 341. The system can further detect an additional user input that interacts with the 3D frame 442. In response to the additional user input, the system can cause the 3D frame 442 to rotate in any direction and show different views or perspectives of the 3D frame 442. The different views or perspectives can show visual details (e.g., characteristics, properties, specifications, etc.) of the 3D rendition of the object 342 that is associated with the item 341. The 3D frame 442 remains fixed, or anchored to, the position of the item 341. In other words, the system continues to present the item 341 in context with others of the objects 330. At the same time, however, the system presents the 3D frame 442 and rotates it to present various 3D views.

The system can further automatically change a 2D view to a 3D view without a direct user indication to do so. For example, the system can detect activity that specifies that a 2D view may not be sufficient to extend a view or working space and automatically toggle a select portion of content to 3D. The system may, for instance, detect that the second path 340 is growing too long to fit into the area 321 and, as a result, automatically toggle the area 321 to a 3D view. In another example, the system may detect a specified number of items on a viewing area and, based on the number of the items, automatically enable 3D viewing. For instance, if the number of the objects 330 reaches a certain number and/or the size of the objects 330 reaches a specific size because of a density of the objects 330 within the window 301, the system can enable 3D viewing for any of the objects 330. The system can also automatically toggle back to a 2D view. For instance, if a user selects one or more of the objects 330 in the first path 350, then the system may cause the 3D frame 442, of FIG. 4, to automatically toggle back to the 2D view of the object 342 shown in FIG. 3.

Figure 7:
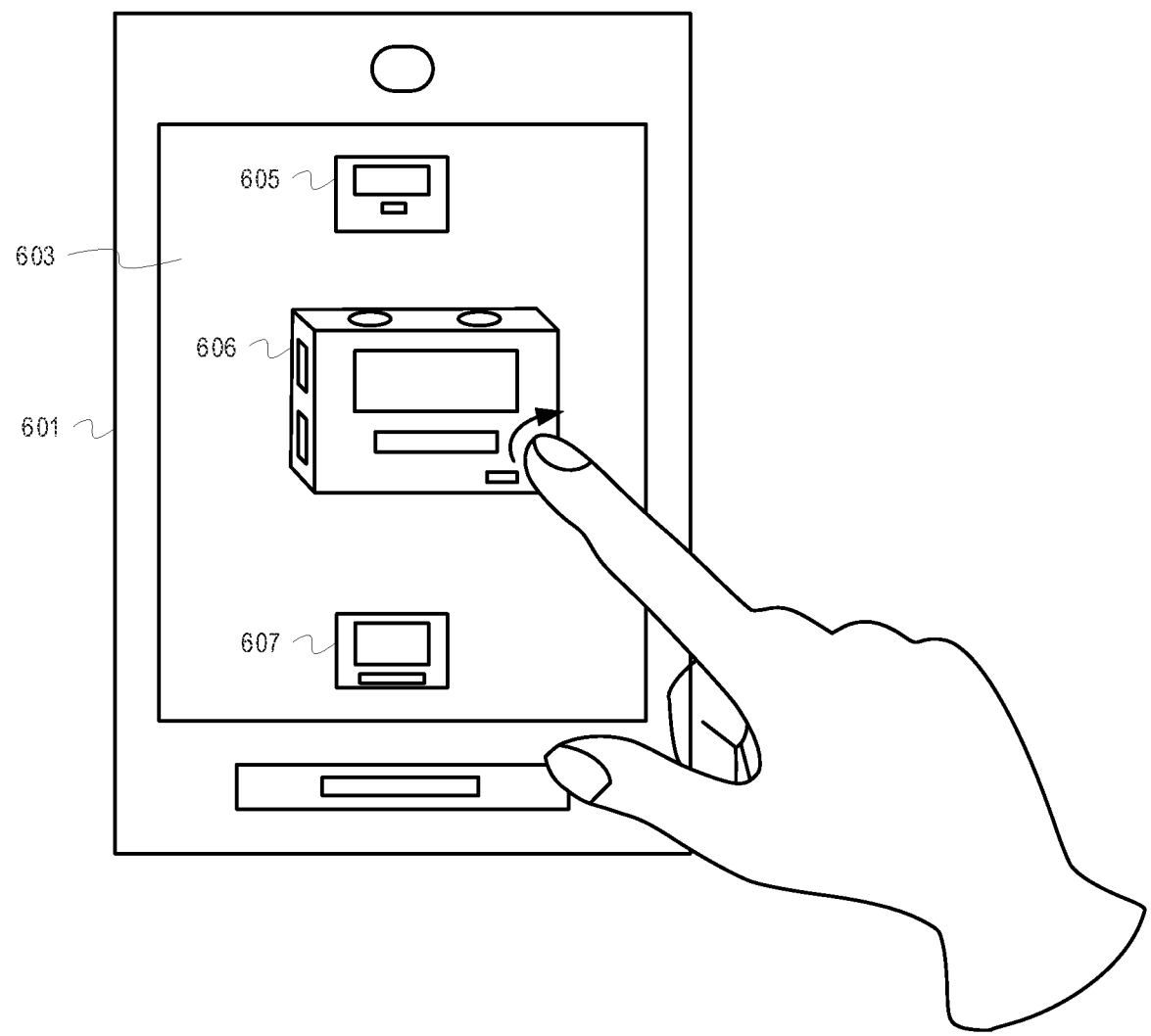
Figure 8:
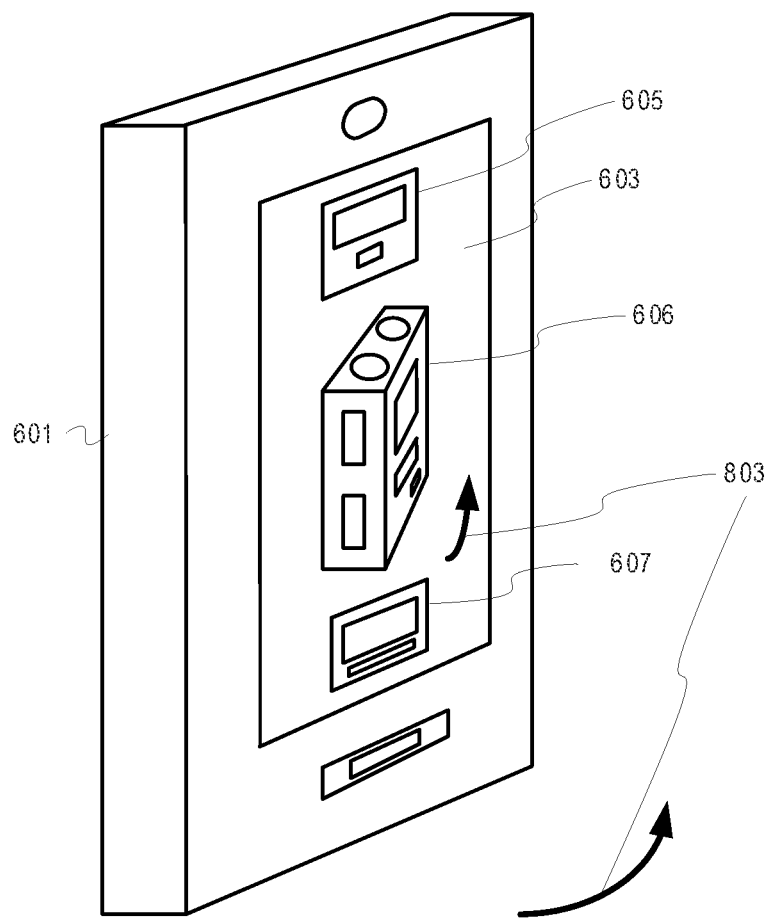

FIGS. 6-9 are example conceptual diagrams of presenting various portions of content on a graphical user interface of a mobile device in three-dimensional views. FIGS. 6-9 illustrate one or more of the operations described in flow 200. For example, in FIG. 6, a mobile device 601 (e.g., a mobile phone, a reader, an electronic pad, etc.) includes a display 603. The display presents multiple objects 605, 606, and 607 in 2D perspectives. The system detects a selection of the object 606 (e.g., via a user touch on the display 603). Consequently, as shown in FIG. 7, the system changes a 2D view of the object 606 to a 3D view, but maintains a position of the object 606 relative to the objects 605 and 607.

In some embodiments, the system can respond to additional finger motions that rotate the object 606. In other embodiments, the system can respond to movement of the mobile device 601. For example, in FIG. 8, the system detects that the mobile device 601 is twisted in a first direction 803. The system detects the twisting of the mobile device 601 in the first direction 803 and causes the object 606 to rotate in the first direction 803 in response to the twisting in the first direction 803. In other words, the system detects the motion of the mobile device 601 twisting on a vertical axis in the first direction 803. The system also detects a force associated with the twisting of the mobile device 601 (e.g., via gyroscopic mechanisms, accelerometers, etc.), and imparts a rotational physics force to the object 606 which causes the object 606 to rotate in the first direction 803 along a vertical axis for the object 606 and with a proportional force.

Figure 9:
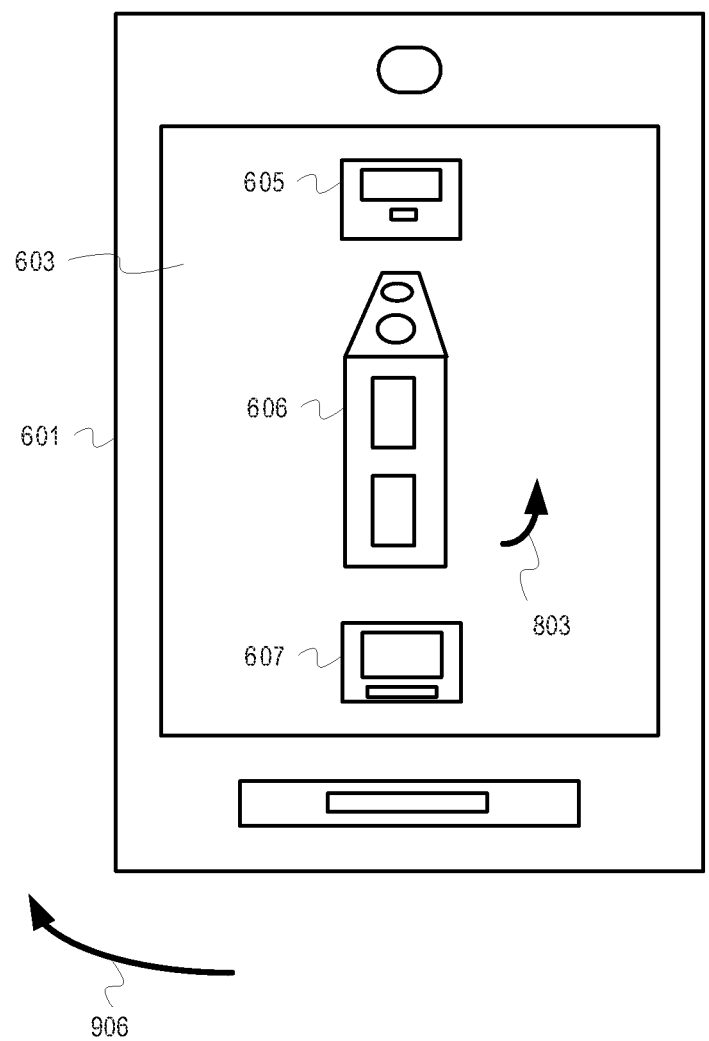

In FIG. 9, the system detects that the mobile device 601 is twisted in a second direction 906, which may be opposite to the first direction 803. The system can, in response to the twisting in the second direction 906, cause the object 606 to twist in the second direction. In other examples, however, the system may cause the object 606 to continue twisting in the first direction 803, but slow the rotational movement of the object 606 as a result of the twist of the mobile device 601 in the second direction 906.

In some embodiments, the mobile device 601 can change 2D views to 3D views based on voice commands, recorded gestures (e.g., pre-specified finger motions), etc.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
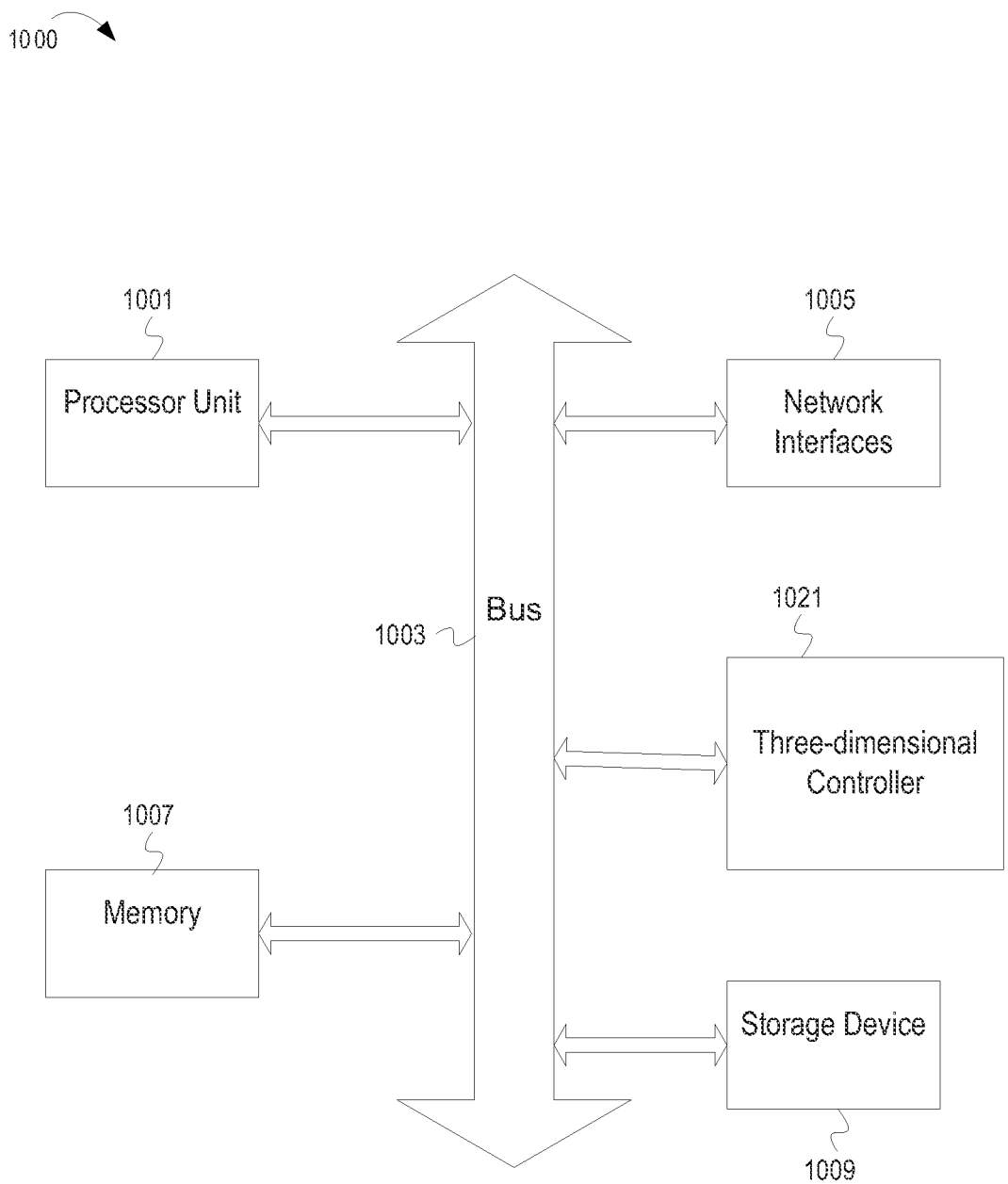
FIG. 10 depicts an example computer system.

FIG. 10 depicts an example computer system 1000. The computer system 1000 includes a processor unit 1001 (possibly including multiple processors, multiple cores, multiple nodes, and/or implementing multi-threading, etc.). The computer system 1000 includes memory 1007. The memory 1007 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media or computer readable storage media. The computer system 1000 also includes a bus 1003 (e.g., PCI bus, ISA, PCI-Express bus, HyperTransport® bus, infiniBand® bus, NuBus bus, etc.), a network interface 1005 (e.g., an ATM interface, an Ethernet interface, a Frame Relay interface, SONET interface, wireless interface, etc.), and a storage device(s) 1009 (e.g., optical storage, magnetic storage, etc.). The computer system 1000 also includes a three-dimensional controller 1021. The three-dimensional controller 1021 can modify selected portions of content in three dimensions. Any one of these functionalities may be partially (or entirely) implemented in hardware and/or on the processing unit 1001. For example, the functionality may be implemented with an application specific integrated circuit, in logic implemented in the processing unit 1001, in a co-processor on a peripheral device or card, etc. Further, realizations may include fewer or additional components not illustrated in FIG. 10 (e.g., video cards, audio cards, additional network interfaces, peripheral devices, etc.). The processor unit 1001, the storage device(s) 1009, and the network interface 1005 are coupled to the bus 1003. Although illustrated as being coupled to the bus 1003, the memory 1007 may be coupled to the processor unit 1001.

While the embodiments are described with reference to various implementations and exploitations, it will be understood that these embodiments are illustrative and that the scope of the inventive subject matter is not limited to them. In general, techniques for modifying selected portions of content in three-dimensions as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining that at least a portion of content would be obscured by a border of a graphical user interface in which the content is contained if the content were to be presented in a two-dimensional state via the graphical user interface; and
    via at least one of one or more processors, presenting the at least the portion of the content in a stereoscopic three-dimensional state in response to the determining that the at least the portion of the content would be obscured by the border of the graphical user interface, wherein a stereoscopic depth effect of the stereoscopic three-dimensional state makes the at least the portion of the content that would be obscured appear to extend beyond the border of the graphical user interface.

2. The method of claim 1, wherein the determining that the at least the portion of the content would be obscured by the border of the graphical user interface when presented in the two-dimensional state comprises determining that a size of the at least the portion of content would extend beyond a visible region of the graphical user interface in response to a request to modify the content.

3. The method of claim 1, wherein the presenting the at least the portion of the content in the stereoscopic three-dimensional state comprises modifying visual elements of the at least the portion of the content to have the stereoscopic depth effect.

4. The method of claim 1 wherein the content is a text string having a first portion presented in a window of the graphical user interface, wherein the border of the graphical user interface comprises a border of the window, wherein a length of the text string would increase in response to a change in state of the content, wherein the at least the portion of the content comprises a second portion of the text string that is obstructed by the border of the window when presented in the two-dimensional state, and wherein the presenting the at least the portion of the content in the stereoscopic three-dimensional state causes the second portion of the text string to be appear to extend beyond the border of the window when presented in the stereoscopic three-dimensional state.

5. The method of claim 1, wherein the stereoscopic depth effect is perceptible by one or more of a three-dimensional viewing mechanism and an autostereoscopic display.

6. The method of claim 1 further comprising:
    detecting a change of state to the content after the presenting the at least the portion of the content in the stereoscopic three-dimensional state, wherein the change of the state would cause the at least the portion of the content to not be obscured by the border of the graphical user interface when presented in the two-dimensional state; and
    presenting the at least the portion of the content in the two-dimensional state in response to the change of state of the content.

7. A system comprising:
    one or more processors; and
    a memory storage unit configured to store instructions, which when executed by at least one of the one or more processors, cause the system to perform operations to
        determine that at least a portion of content would be obscured by a border of a graphical user interface in which the content is contained if the content were to be presented in a two-dimensional state via the graphical user interface, and
        present the at least the portion of the content in a stereoscopic three-dimensional state after determining that the at least the portion of the content would be obscured by the border of the graphical user interface, wherein a stereoscopic depth effect of the stereoscopic three-dimensional state makes the at least the portion of the content that would be obscured appear to extend beyond the border of the graphical user interface.

8. The system of claim 7, wherein the operation to determine that the at least the portion of the content would be obscured by the border of the graphical user interface when presented in the two-dimensional state comprises an operation to determine that a size of the at least the portion of content would extend beyond a visible region of the graphical user interface in response to a request to modify the content.

9. The system of claim 7, wherein the operation to present the at least the portion of the content in the stereoscopic three-dimensional state comprises an operation to modify visual elements of the at least the portion of the content to have the stereoscopic depth effect.

10. The system of claim 7, wherein the content is a text string having a first portion presented in a window of the graphical user interface, wherein the border of the graphical user interface comprises a border of the window, wherein a length of the text string would increase in response to a change in state of the content, wherein the at least the portion of the content comprises a second portion of the text string that is obstructed by the border of the window when presented in the two-dimensional state, and wherein the presenting the at least the portion of the content in the stereoscopic three-dimensional state causes the second portion of the text string to be appear to extend beyond the border of the window when presented in the stereoscopic three-dimensional state.

11. The system of claim 7, wherein the stereoscopic depth effect is perceptible by one or more of a three-dimensional viewing mechanism and an autostereoscopic display.

12. The system of claim 7, wherein the memory storage unit is configured to store instructions, which when executed by at least one of the one or more processors, cause the system to further perform operations to:
    detect a change of state to the content after the at least the portion of the content is presented in the stereoscopic three-dimensional state, wherein the change of the state would cause the at least the portion of the content to not be obscured by the border of the graphical user interface when presented in the two-dimensional state; and
    present the at least the portion of the content in the two-dimensional state in response to the change of state of the content.

13. A computer program product comprising:
    a computer readable storage medium having computer readable program code embodied therewith, the computer readable program code comprising:
    computer readable program code configured to,
        determine that at least a portion of content would be obscured by a border of a graphical user interface in which the content is contained if the content were to be presented in a two-dimensional state via the graphical user interface, and
        present the at least the portion of the content in a stereoscopic three-dimensional state after determining that the at least the portion of the content would be obscured by the border of the graphical user interface, wherein a stereoscopic depth effect of the stereoscopic three-dimensional state makes the at least the portion of the content that would be obscured appear to extend beyond the border of the graphical user interface.

14. The computer program product of claim 13, wherein the computer readable program code configured to determine that the at least the portion of the content would be obscured by the border of the graphical user interface when presented in the two-dimensional state comprises computer readable program code configured to determine that a size of the at least the portion of content would extend beyond a visible region of the graphical user interface in response to a request to modify the content.

15. The computer program product of claim 13, wherein the computer readable program code configured to present the at least the portion of the content in the stereoscopic three-dimensional state comprises computer readable program code configured to modify visual elements of the at least the portion of the content to have the stereoscopic depth effect.

16. The computer program product of claim 13, wherein the content is a text string having a first portion presented in a window of the graphical user interface, wherein the border of the graphical user interface comprises a border of the window, wherein a length of the text string would increase in response to a change in state of the content, wherein the at least the portion of the content comprises a second portion of the text string that is obstructed by the border of the window when presented in the two-dimensional state, and wherein the computer readable program code configured to present the at least the portion of the content in the stereoscopic three-dimensional state includes computer readable program code configured to cause the second portion of the text string to be appear to extend beyond the border of the window when presented in the stereoscopic three-dimensional state.

17. The computer program product of claim 13, wherein the stereoscopic depth effect is perceptible by one or more of a three-dimensional viewing mechanism and an autostereoscopic display.

18. The computer program product of claim 13, wherein the computer readable program code is further configured to:
   detect a change of state to the content after the at least the portion of the content is presented in the stereoscopic three-dimensional state, wherein the change of the state would cause the at least the portion of the content to not be obscured by the border of the graphical user interface when presented in the two-dimensional state; and
   present the at least the portion of the content in the two-dimensional state in response to the change of state of the content.

19. The method of claim 4, wherein the text string has a range of stereoscopic depth, wherein the first portion of the text string has a first size that indicates a first level of stereoscopic depth within the range of the stereoscopic depth, and wherein the second portion of the text string has a second size, larger than the first size, that indicates a second level of stereoscopic depth with the range of the stereoscopic depth.

* * * * *